United States Patent [19]

Abularach

[11] 3,966,535
[45] June 29, 1976

[54] ENVELOPE SEALING APPARATUS FOR COLD PROCESS TIRE RETREADING

[76] Inventor: Antonio Dabura Abularach, P.O. Box 560, Cochabamba, Bolivia

[22] Filed: Jan. 15, 1975

[21] Appl. No.: 541,136

[52] U.S. Cl. ............................... 156/394; 152/396; 156/96; 301/97; 301/98
[51] Int. Cl.² .................... B29H 5/04; B29H 17/36
[58] Field of Search ............ 156/96, 123, 126–129, 156/394 R, 394 FM; 152/375, 396–398; 301/95, 97, 98, 101, 23–25, 29

[56] References Cited
UNITED STATES PATENTS

| | | | |
|---|---|---|---|
| 3,236,709 | 2/1966 | Carver | 156/96 |
| 3,779,833 | 12/1973 | Reppel | 156/96 |
| 3,802,978 | 4/1974 | Barnett | 156/96 |
| 3,883,382 | 5/1975 | Pelletier | 156/128 R |
| 3,886,028 | 5/1975 | Hindin et al. | 156/96 |

FOREIGN PATENTS OR APPLICATIONS

| | | | |
|---|---|---|---|
| 635,944 | 6/1927 | France | 156/96 |
| 555,727 | 9/1943 | United Kingdom | 156/96 |

*Primary Examiner*—Douglas J. Drummond
*Assistant Examiner*—John E. Kittle
*Attorney, Agent, or Firm*—Keith D. Beecher

[57] ABSTRACT

Apparatus is provided for sealing an envelope around a tire casing during a cold process retreading operation, and which comprises a pair of annular pressure members which are mounted on the casing support rim, and which serve to hold and seal the envelope against the flanges of the rim thereby assuring a perfect seal throughout the envelope area. The apparatus also comprises means for readily mounting the annular members on the rim, and for holding the pressure members in their sealing positions. The latter means also permits the pressure members readily to be demounted from the rim.

3 Claims, 4 Drawing Figures

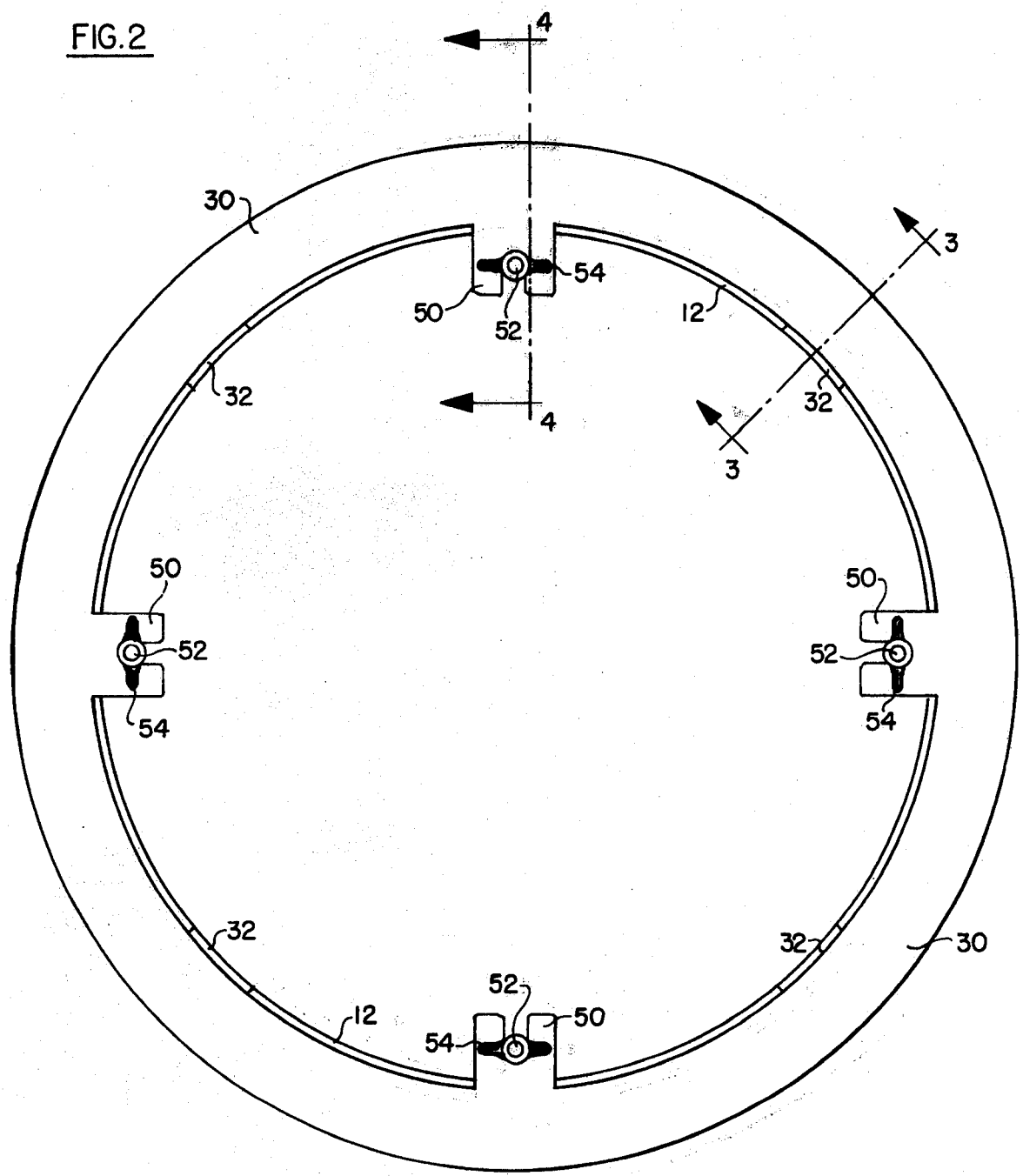

ENVELOPE SEALING APPARATUS FOR COLD PROCESS TIRE RETREADING

BACKGROUND OF THE INVENTION

Various methods have been used in the prior art for retreading tires. One method comprises recapping the worn tire by a hot vulcanizing process, in which an uncured tread is applied to the buffed crown surface of the used tire casing, and the assembly is then vulcanized at a high temperature in an appropriate mold. There are certain disadvantages to this method, and a second method is presently in widespread use in the art. In accordance with the second method, a pre-molded, pre-vulcanized tread strip is bonded to the buffed crown surface of the casing by a so-called cold vulcanization process.

In carrying out the cold vulcanization process, the casing is first buffed to remove as much of the old tread as possible. The crown surface of the casing is then covered by a quantity of uncured rubber, or other bonding agent, and a strip of pre-molded, pre-vulcanized tread is then wrapped around the periphery of the casing. It is then the usual practice to enclose the assembly in a thin envelope which is usually composed of a rubber-like material.

The purpose of the envelope is to permit air pressure within the chamber to be applied uniformly over the tread surface throughout the curing process, without any tendency for the air pressure to extend into the annular space between the tread and casing, and which would tend to lift the tread from the casing and destroy the bond. The envelope also provides an effective escape route for air that might be trapped in the annular space between the tread and the casing, such air being forced out of the annular space when pressure is first applied during the cure cycle of the cold vulcanizing process. For the latter purpose, an appropriate bleeding means, such as nylon mesh, or the like, is interposed between the envelope and the tread/casing combination.

An important objective of the present invention is to provide improved apparatus, whereby the aforesaid envelope may be conveniently held and sealed in position around the tread/casing combination to provide a perfect seal which is independent of tire pressure of spring tension. As stated briefly above, the apparatus of the invention includes annular pressure members which are removably mounted on the rim which supports the casing, and which serve to seal the envelope directly to the outer surfaces of the rim flanges. Hinged bolts and wing nuts are mounted on the rim to provide a simple and quick means for mounting the annular pressure members in place, and for permitting the pressure members readily to be demounted from the rim. Guides are provided on the rim to assure that the annular sealing members will be properly centered with respect to the casing. The apparatus of the invention is advantageous in that its envelope sealing capabilities do not depend on tire pressure or spring tension. The apparatus of the invention assures that the envelope will be held firmly under all conditions, with a perfect seal being established throughout all the interior envelope area.

BRIEF DESCRIPTION OF THE DRAWINGS

FIG. 2 is a plan view of the apparatus in accordance with one embodiment;

DETAILED DESCRIPTION OF THE ILLUSTRATED EMBODIMENT

Figure 1:
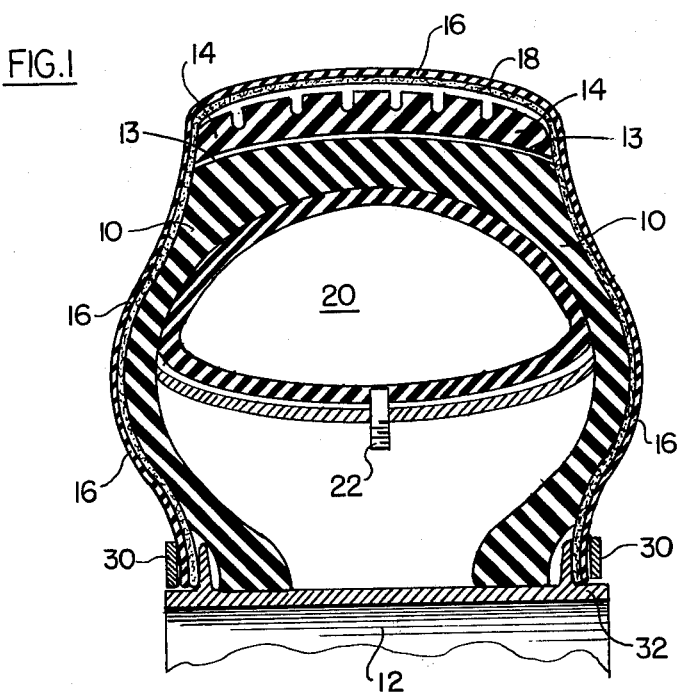
FIG. 1 is a sectional representation of a typical tire combination undergoing the cold process vulcanizing treatment, and showing the tire mounted on a supporting rim, with an enclosing envelope being held in place by means of the apparatus of the invention.

As shown in FIG. 1, a tire casing 10 is supported on a rim 12 so that it may be treated in accordance with the cold vulcanizing retreading process. As explained above, the casing 10 is first buffed to a smooth condition, and a bonding agent 13 is coated about its crown surface. A pre-molded, pre-vulcanized tread strip 14 is wrapped around the coated crown surface, and the assembly is then enclosed in an envelope 16 of a rubber-like material.

A nylon mesh, or the like, 18 is interposed between the envelope and the tread/casing combination, to provide bleed paths for air trapped within the annular space between the tread 14 and the crown surface of the casing 10. This air is then exhausted through suitable ports to the atmosphere. A curing bag 20 may be inserted into the tire casing 10, and the curing bag is inflated through a nozzle 22. In this way an internal pressure is provided within the casing to permit it to be subjected to external pressure within the curing autoclave to bond the tread 14 to the crown surface of the casing. When tubless tires are used, the curing bag 20 may be dispensed with, and the pressurized fluid introduced directly into the interior of the tire, as is well known.

Figure 3:
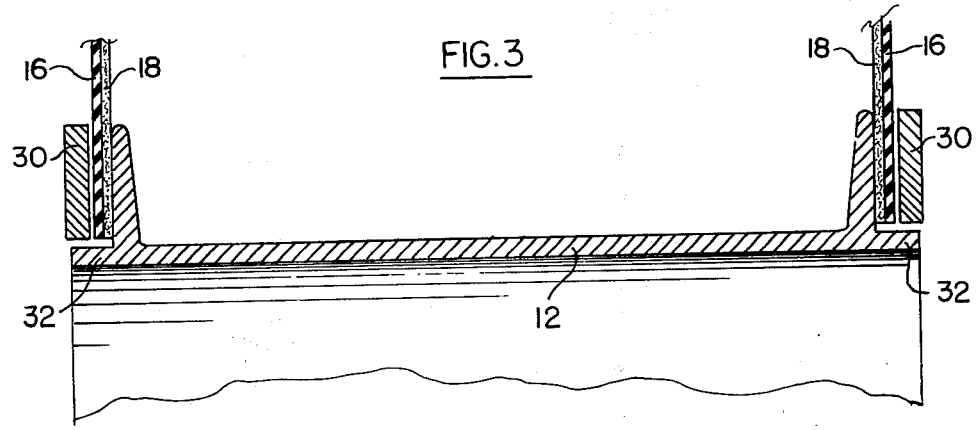
FIG. 3 is a section taken along the line 3—3 of FIG. 2.
Figure 4:
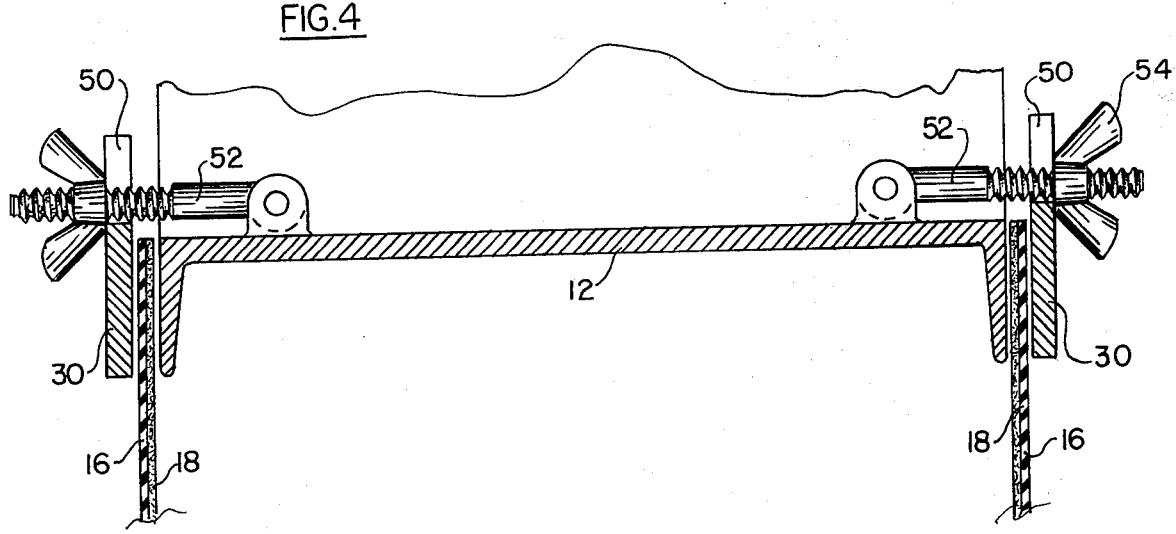
FIG. 4 is a section taken along the line 4—4 of FIG. 2.

As shown in FIG. 1, in accordance with the present invention, the envelope 16 is held in a sealed condition by annular pressure members 30 which are mounted on guides 32 on the rim 12. The annular pressure member 30 is shown in more detail in FIGS. 2–4 As shown, the annular members 30 are supported on the guides 32 which are formed integral with each end of the rim 12 at spaced angular positions around the rim.

Each annular pressure member 30 has radially inwardly extending integral ears 50 at spaced angular positions about its bore surface, and hinged bolts 52 are mounted on the inner surfaces of the rim demountably to position the annular members on the rim. The bolts 52 have wing nuts 54 which facilitate the ease with which the annular members 30 may be mounted and demounted. As the wing nuts are tightened, the pressure members squeeze the inner edges of the envelope 16 against the outer surfaces of the flanges at each end of the rim.

In mounting the tire assembly on the rim 12 in FIG. 1, the inner ends of the envelope 16 are drawn down adjacent the outer surfaces of the two rim flanges, and the pressure members 30 are positioned on the guides 32. The bolts 52 are then turned into radial slots in the ears 50, and the wing nuts 54 are tightened. This causes the annular members to press the inner edges of the envelope 16 against the rim flanges, securely to hold the envelope in place, and to assure a perfect seal throughout the entire interior envelope area. In addition to the ease with which the annular members 30 may be mounted and demounted, the resulting apparatus provides an improved sealing system in which the seals for the envelope do not depend on tire pressure or spring tension, as is the case an many of the prior art arrangements.

The invention provides, therefore, an improved and simplified apparatus for sealing the envelope of the tread/casing combination during the cold vulcanizing process. Although one embodiment of the invention has been shown and described, modifications may be made. It is intended in the claims to cover the modifications which come within the spirit and scope of the invention.

What is claimed is:

1. Apparatus for holding and sealing an envelope about a tire casing and tread strip assembly during a cold vulcanization operation, which includes: a rim member for supporting a tire casing said rim member having outwardly extending radial flanges on the outer peripheral surface thereof at opposite ends thereof for receiving the ends of the envelope adjacent to the respective outer surfaces of the flanges; an annular pressure member mounted on each end of the rim member adjacent to the outer surface of a corresponding one of the flanges with the ends of the envelope being received between the pressure members and the flanges; axially extending guide means formed on the rim member at the opposite ends thereof and at spaced angular positions thereon for supporting the annular pressure members; and means for forcing each pressure member axially inwardly towards the corresponding flange to squeeze the corresponding end of the envelope against the outer surface of the corresponding flange so as to provide a securing means for the envelope.

2. The apparatus defined in claim 1, in which the annular pressure members each includes inwardly extending radial ears, and in which said forcing means includes bolt means mounted on the rim for removably engaging the ears of the pressure members.

3. The apparatus defined in claim 2, in which the bolt means comprises a plurality of bolts hinged to the rim member, and a corresponding plurality of wing nuts respectively threaded to the bolts and engaging the respective pressure members.

* * * * *